US011651534B2

(12) United States Patent
Xiao et al.

(10) Patent No.: US 11,651,534 B2
(45) Date of Patent: May 16, 2023

(54) DYNAMIC DEMONSTRATION METHOD AND SYSTEM FOR WATER-SOLUBLE ION CONCENTRATION AND COMPOSITION OF AEROSOL

(71) Applicants: INSTITUTE OF URBAN ENVIRONMENT, CHINESE ACADEMY OF SCIENCES, Xiamen (CN); NINGBO (BEILUN) ZHONGKE HAIXI INDUSTRIAL TECHNOLOGY INNOVATION CENTER, Ningbo (CN)

(72) Inventors: Hang Xiao, Ningbo (CN); Sile Hu, Ningbo (CN); Lei Tong, Ningbo (CN); Jianrong Li, Ningbo (CN); Keqiang Wang, Ningbo (CN)

(73) Assignees: INSTITUTE OF URBAN ENVIRONMENT, CHINESE ACADEMY OF SCIENCES, Ningbo (CN); NINGBO (BEILUN) ZHONGKE HAIXI INDUSTRIAL TECHNOLOGY INNOVATION CENTER, Ningbo (CN)

( * ) Notice: Subject to any disclaimer, the term of this patent is extended or adjusted under 35 U.S.C. 154(b) by 0 days.

(21) Appl. No.: 17/453,048

(22) Filed: Nov. 1, 2021

(65) Prior Publication Data

US 2022/0148240 A1 May 12, 2022

(30) Foreign Application Priority Data

Nov. 9, 2020 (CN) ........................ 202011239202.3

(51) Int. Cl.
*G06T 11/20* (2006.01)
*G01N 1/02* (2006.01)
(Continued)

(52) U.S. Cl.
CPC ............ *G06T 11/206* (2013.01); *G06F 16/29* (2019.01); *G01N 1/2202* (2013.01); *G01N 2001/021* (2013.01); *G01N 2001/2223* (2013.01)

(58) Field of Classification Search
None
See application file for complete search history.

(56) References Cited

FOREIGN PATENT DOCUMENTS

| | | |
|---|---|---|
| CN | 107144307 A | 9/2017 |
| CN | 109596471 A | 4/2019 |

OTHER PUBLICATIONS

Andrew Hassell, Dean F. Martin, "A Computer-Generated (Q-Basic) Program to Construct Maucha Diagrams", 1995, Florida Scientist 58(3):300-312 (Year: 1995).*

(Continued)

*Primary Examiner* — Michael J Cobb
(74) *Attorney, Agent, or Firm* — Innovation Capital Law Group, LLP; Vic Lin

(57) ABSTRACT

Disclosed is a dynamic demonstration method for water-soluble ion concentration and components of an aerosol. The method comprises: obtaining concentration data of each ion in an atmospheric aerosol of a target city in a preset time period and filling the concentration data in a data table; obtaining vertex coordinates of each ion in a Maucha graph according to equivalent concentration data of each ion; drawing an aerosol ion Maucha graph of the target city in each preset time period according to the vertex coordinates; and finally making a dynamic picture according to a temporal graph of aerosol ion concentration in various time periods.

2 Claims, 3 Drawing Sheets

(51) Int. Cl.
*G06F 16/29* (2019.01)
*G01N 1/22* (2006.01)

(56) References Cited

OTHER PUBLICATIONS

Domino, "Shiny in (R)," 2022, Domino, retrieved from https://www.dominodatalab.com/data-science-dictionary/shiny-in-r (Year: 2022).*

K Murray, J Dabrowski, L Hill, M du Preez, M Kadiaka, W Strydom, "Water Quality Data and Information: A Communicator's Manual", 2010, Report to the Water Research Commission WRC TT394/10, ISBN: 978-1-77005-837-8, pp. 17, 29, 30 (Year: 2010).*

M Silberbauer, "What is a Maucha Diagram?", 2006, Water and Sanitation Department, Republic of South Africa, retrieved from http://www.dwa.gov.za/iwqs/gis_apps/maucha.pdf (Year: 2006).*

* cited by examiner

```
┌─────────────────────────────────────────────────────────┐
│ Converting ion categories in a water body in an          │──╮  S0
│ original Maucha graph to ion categories in the           │
│ atmospheric aerosol                                      │
└─────────────────────────────────────────────────────────┘
                          ↓
┌─────────────────────────────────────────────────────────┐
│ Obtaining concentration data of each ion in an           │──╮  S1
│ atmospheric aerosol of a target city in a preset time    │
│ period, converting the concentration data of each ion    │
│ into equivalent concentration data of each ion, and      │
│ filling the equivalent concentration data of each ion    │
│ in a data table                                          │
└─────────────────────────────────────────────────────────┘
                          ↓
              ┌──────────────────────┐
              │ Importing a data table│
              └──────────────────────┘
                          ↓
┌────────────────────────────────────────────┐      Y     ┌────────────────────┐
│ There are more than a preset number of      │──────────→│ Deleting the row of │
│ missing data in a row of the data table or  │            │ data                │
│ not?                                        │            └────────────────────┘
└────────────────────────────────────────────┘
                          ↓ N
┌─────────────────────────────────────────────────────────┐
│ Obtaining a radius of a circle in a Maucha graph and a   │──╮  S2
│ diagonal length corresponding to a quadrilateral of      │
│ each ion in the Maucha graph according to a first        │
│ calculation formula on the basis of the equivalent       │
│ concentration data of each ion                           │
└─────────────────────────────────────────────────────────┘
                          ↓
┌─────────────────────────────────────────────────────────┐
│ Obtaining vertex coordinates of each ion in the Maucha   │──╮  S3
│ graph according to a second calculation formula on the   │
│ basis of the diagonal length                             │
└─────────────────────────────────────────────────────────┘
                          ↓
┌─────────────────────────────────────────────────────────┐
│ Drawing an aerosol ion Maucha graph of the target city   │──╮  S4
│ in each preset time periods according to the vertex      │
│ coordinates of each ion in the Maucha graph              │
└─────────────────────────────────────────────────────────┘
                          ↓
   N  ┌─────────────────────────────────────────────────┐
◀─────│ The aerosol ion Maucha graphs of all target      │──╮  S5
      │ cities are completed or not                      │
      └─────────────────────────────────────────────────┘
                          ↓ Y
┌─────────────────────────────────────────────────────────┐
│ Superimposing the aerosol ion Maucha graph of each       │──╮  S6
│ target city in the same time period on a geographical    │
│ map according to the latitude and longitude information  │
│ and drawing a temporal graph of aerosol ion              │
│ concentration                                            │
└─────────────────────────────────────────────────────────┘
                          ↓
┌─────────────────────────────────────────────────────────┐
│ Making a dynamic picture according to the temporal       │──╮  S7
│ graph of aerosol ion concentration in each time period   │
└─────────────────────────────────────────────────────────┘
```

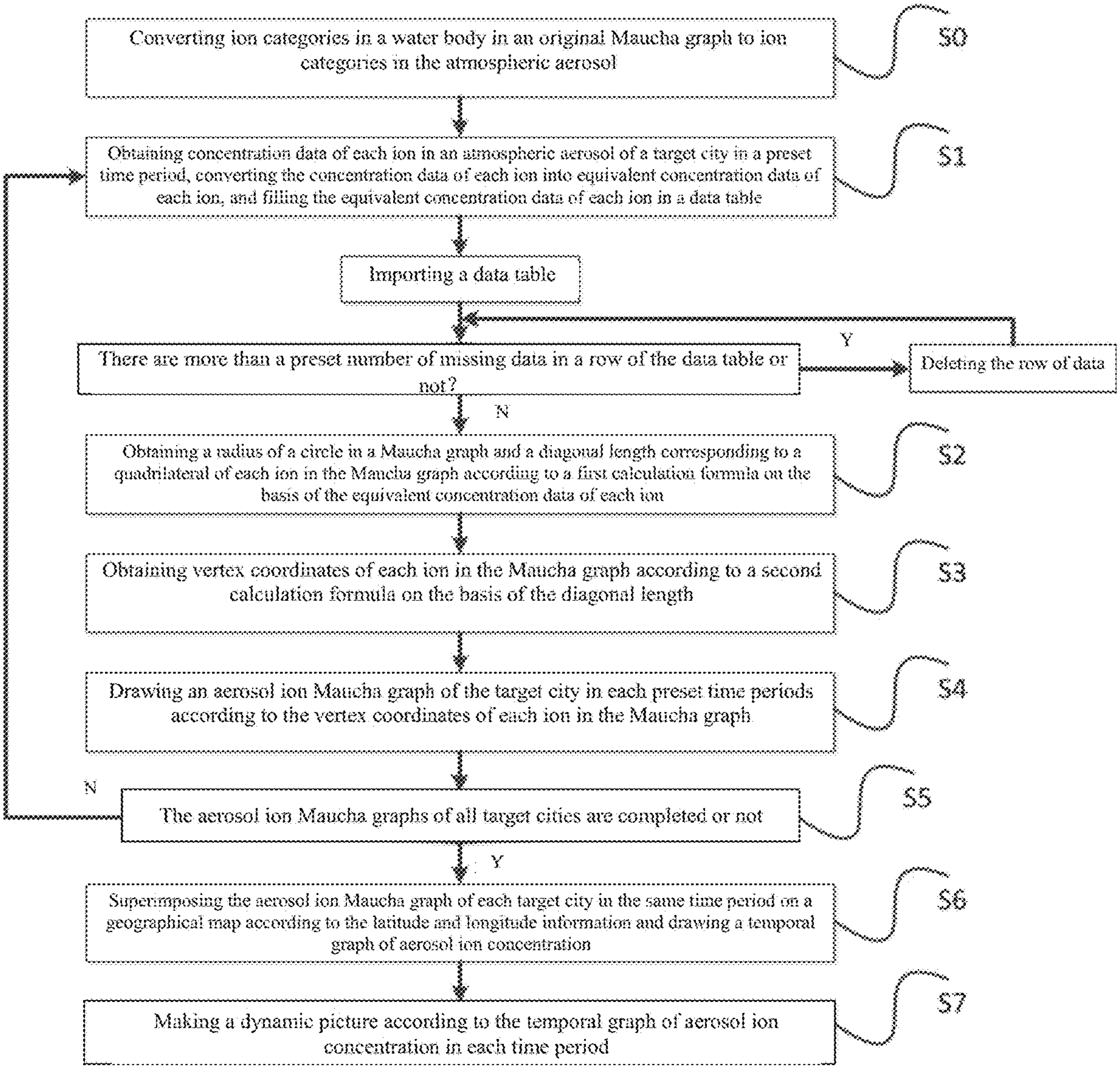

Fig. 1

DYNAMIC DEMONSTRATION METHOD AND SYSTEM FOR WATER-SOLUBLE ION CONCENTRATION AND COMPOSITION OF AEROSOL

BACKGROUND OF THE INVENTION

1. Technical Field

The present disclosure relates to the field of scientific measurement, and in particular to a dynamic demonstration method and system for water-soluble ion concentration and composition of an aerosol.

2. Description of Related Art

Aerosol refers to a relatively stable suspension system formed by solid or liquid particles uniformly dispersed in a gas. The clouds in the sky, the morning mist in the forest, the rising sand and dust, the droplets from the ocean, the smoke and dust emitted by industries, the dust formed during construction on construction sites, pesticide spraying, artificial rainfall, etc. are all concrete manifestations of an aerosol in life. Atmospheric aerosol can affect solar radiation and the formation of cloud condensation nuclei and may form photochemical pollution under light conditions; moreover, fine particles in the aerosol can also enter human lungs through the respiratory tract and deposit in the alveoli, causing organ diseases. It can be seen that the aerosol has a very important impact on climate change, atmospheric environment and human health. As more and more attention is paid to the problem of air pollution in China, the research on the atmospheric aerosol has gradually become a hot topic in scientific research.

The chemical composition of the atmospheric aerosol is very complex, and water-soluble inorganic ions are an important part of the atmospheric aerosol. The water-soluble components include a variety of important substances, such as sulfates, nitrates, and the like. These components can change the size, composition, pH, quantity and life of the aerosol through moisture absorption. In addition, the water-soluble components can also increase the solubility of toxic and harmful substances and cause harm to human health. Inorganic ions in the aerosol can be divided into primary ions and secondary ions according to their sources. The primary ions refer to inorganic ions directly discharged into the atmosphere by an emission source, and the secondary ions refer to inorganic ions converted from the primary ions through chemical reactions in the atmosphere. Sulfates, nitrates, and ammonium salts, also known as SNA, are important inorganic ions in the secondary aerosol and are important indicators to characterize regional pollution. These ions mainly come from secondary aerosols formed during the transformation of gas particles in the atmosphere.

Research on inorganic ions in the aerosol helps to reveal the source and composition of the aerosol and is an important method for studying the atmospheric aerosol. At present, monitoring stations have been set up all over the country to monitor the changes in the concentration of various pollutant components in the atmosphere. As a result, a large amount of monitoring data has been accumulated for people to analyze. However, there is still a lack of effective methods for processing and mining monitoring data. In addition, due to the mobility of the aerosol itself, it may affect the air quality in many areas for a period of time. By comparing the changes of water-soluble ions in aerosols in different regions, it may help us to understand the source and formation of various components in the aerosols. However, there is still a lack of similar methods to solve this problem. In view of the above two points, a method is provided to dynamically display the relative composition of water-soluble ions in aerosol over time on a spatial scale. By displaying the changes of water-soluble ion concentrations in aerosols in different cities on a map, the changes of water-soluble ion concentration in different cities can be observed within a period of time, and then some of connections hidden therein can be further revealed.

BRIEF SUMMARY OF THE INVENTION

In order to solve the above problems and fully display the change in ion concentration of the atmospheric aerosol according to time change and regional change, the present disclosure provides a dynamic demonstration method for water-soluble ion concentration and composition of an aerosol, including the following steps:

S1: obtaining concentration data of each ion in an atmospheric aerosol of a target city in a preset time period, converting the concentration data of each ion into equivalent concentration data of each ion, and filling the equivalent concentration data of each ion in a data table;

S2: importing the data table, and obtaining a radius of a circle in a Maucha graph and a diagonal length corresponding to a quadrilateral of each ion in the Maucha graph according to a first calculation formula on the basis of the equivalent concentration data of each ion;

S3: obtaining vertex coordinates of each ion in the Maucha graph according to a second calculation formula on the basis of the diagonal length;

S4: drawing an aerosol ion Maucha graph of the target city in each preset time periods according to the vertex coordinates of each ion in the Maucha graph; and

S5: determining whether the aerosol ion Maucha graphs of all target cities are completed or not, if not, switching the target city and returning to step S1;

wherein the first calculation formula is:

$$R^2\times\sin 22.5°/2=T/16,\ b\times R\times\sin 22.5°/2=P/2;$$

the second calculation formula is:

$$bx=b\times\cos(22.5°+45°\times n),\ by=b\times\sin(22.5°+45°\times n);$$

in the formulas, R refers to the radius of the circle in the Maucha graph; T refers to total equivalent concentration of eight major ions in the atmospheric aerosol; b refers to a diagonal length corresponding to a quadrilateral of a corresponding ion in the Maucha graph; P refers to the equivalent concentration of the corresponding ion; bx refers to the abscissa of a vertex of the corresponding ion; by refers to an ordinate of the vertex of the corresponding ion; n refers to a constant variable that changes with an angle of a line of hexadec-section in the quadrilateral corresponding to the ion in the circle, and the value of n begins to vary counterclockwise with the starting angle (22.5°) of the line of hexadec-section and increases from 0 to 7.

Further, the data table also includes time information and latitude and longitude information of the target city corresponding to the concentration data of each ion.

Further, before step S1, the method further includes:

Step S0: converting ion categories in a water body in an original Maucha graph to ion categories in the atmospheric aerosol;

the ion categories in the atmospheric aerosol include eight major ions which are $K^+$, $Na^+$, $Ca^{2+}$, $NH_4^+$, $SO_4^{2-}$, $Cl^-$, $NO_3^-$, and $F^-$, respectively.

Further, after step S5, the method further includes:

S6: superimposing the aerosol ion Maucha graph of each target city in the same time period on a geographical map according to the latitude and longitude information, and drawing a temporal graph of aerosol ion concentration; and S7: making a dynamic picture according to the temporal graph of aerosol ion concentration in each time period.

Further, R-Shiny is used for writing and packaging in steps S2 to S7 and packaging results are displayed on a web terminal.

Further, in step S2, in the process of importing the data table, the data need to be determined. If there are more than a preset number of missing data in a row of the data table, the row of data is deleted.

The present disclosure further provides a dynamic demonstration system for water-soluble ion concentration and composition of an aerosol, including an import module, a calculation module, and a drawing module, wherein the import module is configured to import equivalent concentration data of each ion in an atmospheric aerosol of a target city in a preset time period in a data table and transmit the equivalent concentration data to the calculation module;

the calculation module is configured to obtain vertex coordinates of each ion in a Maucha graph according to a first calculation formula and a second calculation formula on the basis of the equivalent concentration data of each ion;

the drawing module is configured to draw an aerosol ion Maucha graph of the target city in each preset time period according to the vertex coordinates of each ion in the Maucha graph;

wherein the first calculation formula is:

$$R^2 \times \sin 22.5°/2 = T/16,\ b \times R \times \sin 22.5°/2 = P/2;$$

the second calculation formula is:

$$bx = b \times \cos(22.5° + 45° \times n),\ by = b \times \sin(22.5° + 45° \times n);$$

in the formulas, R refers to the radius of the circle in the Maucha graph; T refers to the total equivalent concentration of eight major ions in the atmospheric aerosol; b refers to a diagonal length corresponding to a quadrilateral of the corresponding ion in the Maucha graph; P refers to the equivalent concentration of the corresponding ion; bx refers to the abscissa of a vertex of the corresponding ion; by refers to an ordinate of the vertex of the corresponding ion; n refers to a constant variable that changes with an angle of a line of hexadec-section in the quadrilateral corresponding to the ion in the circle, and the value of n begins to vary counterclockwise with the starting angle (22.5°) of the line of hexadec-section and increases from 0 to 7.

Further, the data table also includes time information and latitude and longitude information of the target city corresponding to the concentration data of each ion.

Further, the import module is further configured to convert ion categories in a water body in an original Maucha graph to ion categories in the atmospheric aerosol;

the ion categories in the atmospheric aerosol include eight major ions which are $K^+$, $Na^+$, $Ca^{2+}$, $NH_4^+$, $SO_4^{2-}$, $Cl^-$, $NO_3^-$, and $F^-$, respectively.

Further, the drawing module further includes a superimposing unit, configured to superimpose the aerosol ion Maucha graph of each target city in the same time period on a geographical map according to the latitude and longitude information, draw a temporal graph of aerosol ion concentration, and make a dynamic picture according to the temporal graph of aerosol ion concentration in each time period.

Further, the import module further includes a determining unit, configured to determine the data, wherein if there are more than a preset number of missing data in a row of the data table, the row of data is deleted.

Further, R-Shiny is used for writing and packaging in the import module, the calculation module, the drawing module, the superimposing unit, and the determining unit, and packaging results are displayed on a web terminal.

Compared with the prior art, the present disclosure at least has the following beneficial effects:

(1) The dynamic demonstration method and system for water-soluble ion concentration and composition of an aerosol in the present disclosure displays the water-soluble ions in the atmospheric aerosol through the Maucha graph, so that the concentration of each ion can be displayed more intuitively.

(2) By integrating the aerosol ion Maucha graphs of various cities in the same time period on the same geographical map, the temporal graph of aerosol ion concentration is made, and the temporal graphs in various time periods are integrated into a dynamic picture, which can more intuitively display the concentration change trend and composition of water-soluble ions in the atmospheric aerosol of different cities in different time periods in the same time dimension.

(3) R language (Shiny data package) is used to package and write programs, and the corresponding tasks (such as data import, data analysis, drawing, etc.) can be completed according to simple data without relying on front-end and back-end engineers. Because the R language is used and the operation can be easily displayed on the web terminal, it is easier to be accessed by other users, thus facilitating the transmission of information.

BRIEF DESCRIPTION OF THE SEVERAL VIEWS OF THE DRAWINGS

FIG. 1 is a schematic diagram of method steps of a dynamic demonstration method for water-soluble ion concentration and composition of an aerosol;

DETAILED DESCRIPTION OF THE INVENTION

Figure 2:
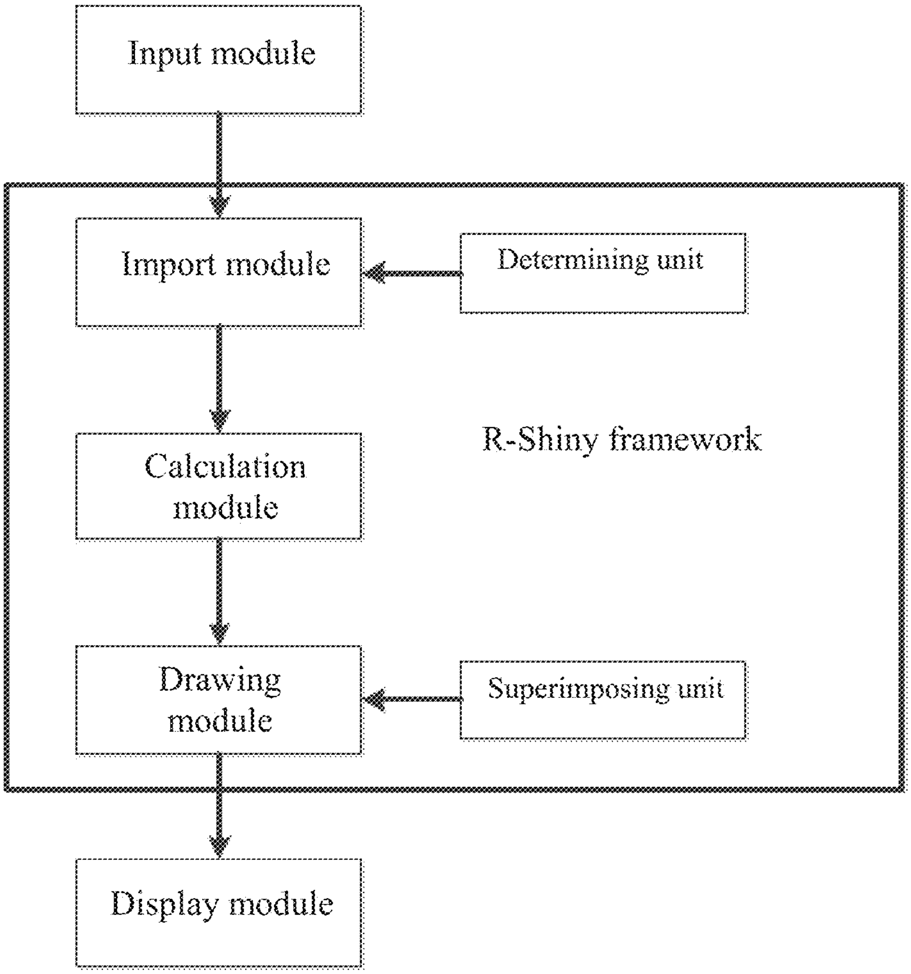
FIG. 2 is a schematic diagram of a system structure of a dynamic demonstration system for water-soluble ion concentration and composition of an aerosol.

The following are specific embodiments of the present disclosure and further describe the technical solutions of the present disclosure in conjunction with the accompanying drawings, but the present disclosure is not limited to these embodiments.

Embodiment 1

In order to solve the above problems and fully display the change in ion concentration of the atmospheric aerosol according to time change and regional change, as shown in FIG. 1, the present disclosure provides a dynamic demonstration method for water-soluble ion concentration and composition of an aerosol, including the following steps.

In step S1, concentration data of each ion in an atmospheric aerosol of a target city in a preset time period is obtained, the concentration data of each ion is converted into equivalent concentration data of each ion, and the equivalent concentration data of each ion is filled in a data table.

In the data table, in order to obtain more comprehensive information for subsequent drawing, the data table further includes corresponding time information, longitude and latitude information of the target city corresponding to the concentration data of each ion, and the like, so that areas can be divided according to the longitude and latitude during the subsequent drawing.

Certainly, the Maucha graph should not be simply used directly. Because the original Maucha graph is mainly used for water bodies, but in the present invention the original Maucha graph is used for an atmospheric aerosol, the water body and the atmospheric aerosol are different in ion categories, and the ion categories of the atmospheric aerosol need to be adjusted. Therefore, before step S1, the method further includes:

Step S0: converting ion categories in a water body in an original Maucha graph to ion categories in the atmospheric aerosol;

the ion categories in the atmospheric aerosol include eight major ions which are $K^+$, $Na^+$, $Ca^{2+}$, $NH_4^+$, $SO_4^{2-}$, $Cl^-$, $NO_3^-$, and $F^-$, respectively.

Because an atmospheric combination of the above-mentioned ions contains a variety of chemical pollutants, the concentrations of these ions can be detected to analyze the concentrations of chemical pollutants such as hydroxides, hydrocarbons, and sulfides in the atmosphere.

In step S2, the data table is imported, and a radius of a circle in a Maucha graph and a diagonal length corresponding to a quadrilateral of each ion in the Maucha graph are obtained according to a first calculation formula on the basis of the equivalent concentration data of each ion.

In some cases, data missing may be detected. If the number of missing data reaches a preset number (specifically a value that makes a drawing function wrong, for example, it is assumed that the preset number is set to 2, there are 7 data units when all data in a row is not missing; when in the imported data table, there are missing data in 2 or more data units in a row, then the drawing function will be biased), in order to avoid the adverse effect of missing data on data analysis and drawing, the process of importing the data table in step S2 further includes data determination. If there are more than a preset number of missing data in a row of the data table, the row of data is deleted.

Figure 3:
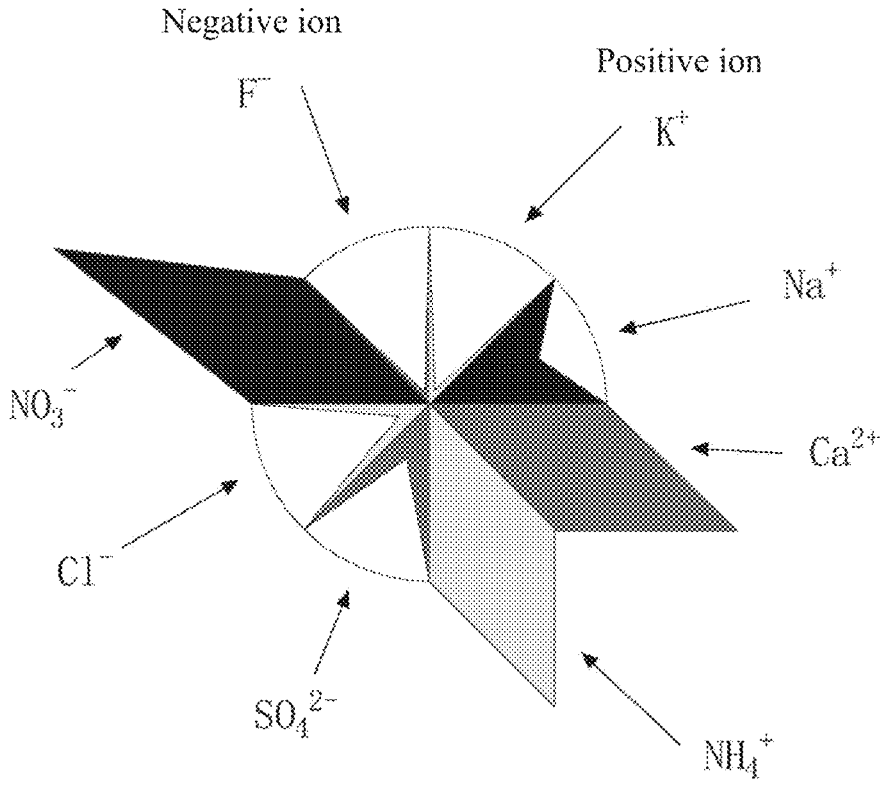
FIG. 3 is a schematic diagram of composition of a Maucha graph.
Figure 4:
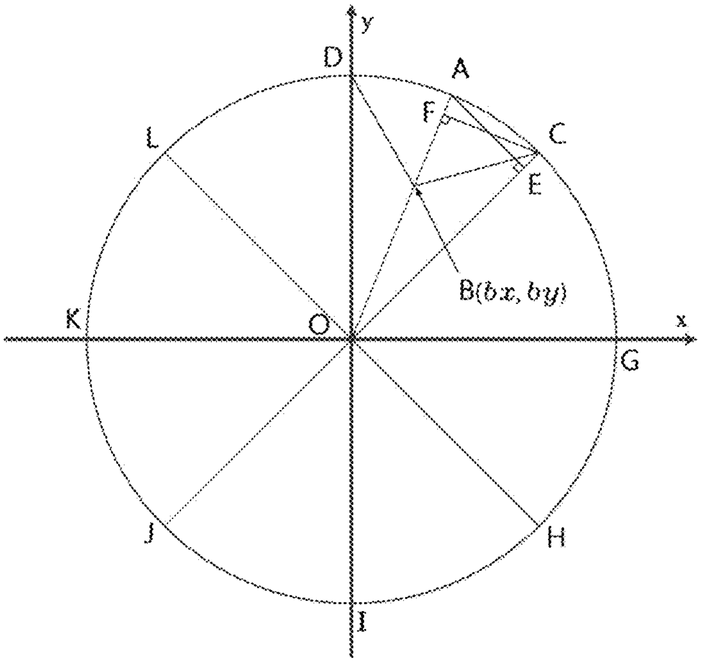
FIG. 4 is a schematic diagram of a Maucha graph drawing method.

As shown in FIG. 3, the Maucha graph consists of a circle and 8 quadrilaterals each having two sides located in the circle. The area of each quadrilateral represents the equivalent concentration of an ion corresponding to the quadrilateral in the atmosphere. Specifically, the circle is equally divided into four ¼ circles up, down, left, and right. Each ¼ circle is divided into two ⅛ circles. Eight quadrilaterals are located within the eight ⅛ circles and their extension areas. Two sides of the ⅛ circle connected to the center of the circle constitute two sides of the quadrilateral, and the center of the circle serves as one of the corner points of each quadrilateral. The radius of the circle is determined by the area of an inscribed regular hexadecagon of the circle, and the area of the inscribed regular hexadecagon should be consistent with the total concentration of the eight major ion components mentioned above. The quadrilateral representing a certain ion component is determined as follows. As shown in FIG. 4 (in this figure, Point O represents the center of the circle at point (0,0) on an xy coordinate axis; Points D, C G, H, I, J, K, and L are oct-section points of the circle, lines of oct-section are line segments that connect the center of the circle and the oct-section points of the circle, that is, the line segments OD, OC, OG, OH, OI, OJ, OK, OL, the lines of oct-section divide the circle into eight equal parts; Point A represents a hexadec-section point of the circle on a CD Arc, lines of hexadec-section are line segments that connect the center of the circle and the hexadec-section points of the circle, the lines of hexadec-section divide the circle into eight sixteen equal parts; Point B is hypothetical and represents a vertex of a certain ion on a line of hexadec-section at a certain equivalent concentration of the ion; Point E represents a vertical point of Point A on a line segment OC; Point F represents a vertical point of Point C on a line segment OA): when the circle is equally divided into eight sectors, for each sector, a quadrilateral can be defined by two line segments (such as the line segment OD and the line segment OC) that make up the sector and a point (e.g., Point B, which is on a ray passing a hexadec-section point of the circle) inside or outside the sector, and the area of the quadrilateral (shaded part as shown in FIG. 3) is required to be equal to the equivalent concentration of the ion. In this way, another 7 quadrilaterals representing other ions are sequentially determined, and the sum of the areas of these eight quadrilaterals must be equal to the area of the inscribed regular hexadecagon of the circle. Therefore, the vertex coordinates of each ion can be obtained by determining the radius of the circle and the corresponding ion concentration to draw a Maucha graph.

In step S3, vertex coordinates of each ion in the Maucha graph are obtained according to a second calculation formula on the basis of the diagonal length.

In step S4, an aerosol ion Maucha graph of a target city in each preset time period is drawn according to the vertex coordinates of each ion in the Maucha graph.

In step S5, it is determined whether the aerosol ion Maucha graphs of all target cities are completed or not; if not, the target city is switched and the process returns to step S1.

wherein the first calculation formula is:

$$R^2 \times \sin 22.5°/2 = T/16,\ b \times R \times \sin 22.5°/2 = P/2;$$

the second calculation formula is:

$$bx = b \times \cos(22.5° + 45° \times n),\ by = b \times \sin(22.5° + 45° \times n);$$

In the formula, R refers to the radius of the circle in the Maucha graph; T refers to the total equivalent concentration of eight major ions in the atmospheric aerosol; b refers to the diagonal length corresponding to the quadrilateral of the corresponding ion in the Maucha graph (as shown in FIG. 3 and FIG. 4, the diagonal corresponding to the quadrilateral of the corresponding ion in the Maucha graph is defined as the line segment connecting the center of the circle—Point O and the vertex—e.g., Point B); P refers to the equivalent concentration of the corresponding ion; bx refers to the abscissa of the vertex of the corresponding ion; by refers to the ordinate of the vertex of the corresponding ion; n refers to a constant variable that changes with an angle of a line of hexadec-section in the quadrilateral corresponding to the ion in the circle, and the value of n begins to vary counterclockwise with the starting angle (22.5°) of the line of hexadec-section and increases from 0 to 7. For example (as shown in FIG. 4), when the quadrilateral corresponding to the current ion is in an area defined by COG, that is, the line of hexadec-section in the quadrilateral is the starting angle of 22.5°, n is 0, and when the quadrilateral corresponding to the current ion is in the area defined by COG, that is, the line of hexadec-section in the quadrilateral is the angle of 45°, n is 1.

In the meanwhile, after step S5, in order to make the final image to be able to fully show the change and transfer trend of ion concentration in the atmospheric aerosol, the following steps are also included.

In step S6, the aerosol ion Maucha graph of each target city in the same time period is superimposed on a geographical map according to the latitude and longitude information, and a temporal graph of aerosol ion concentration is drawn.

S7: making a dynamic picture according to the temporal graph of aerosol ion concentration in each time period.

By superimposing the aerosol ion concentration Maucha graph of each city at the same time on the geographical map, the distribution of pollutants in various places can be clearly shown, and a dynamic picture is made therefrom. On the original basis, the changes of pollutants in various places can be reflected, and the diffusion and movement of pollutants can be analyzed according to the increase or decrease of ion concentration in various places, which is conducive to the tracking of pollutant sources.

It should be noted that R-Shiny is used for writing and packaging in steps S2 to S7 and packaging results are displayed on a web terminal. R-Shiny is used for writing and packaging because Shiny is a web development framework of R language by which users only need to understand some html knowledge to quickly complete web development without deep understanding of css and js. Moreover, the shiny package integrates features such as bootstrap, jquery, ajax, etc., which greatly liberates the productivity of R as a statistical language. In this way, R users of non-traditional programmers can complete some simple data visualization tasks according to their business without relying on front-end and back-end engineers, and quickly verify the reliability of their ideas.

The Shiny application contains two basic components: one is a user interface script, and the other is a server script. In this method, a streaming page in a user interface is mainly used to put parts such as data processing, drawing, and result presentation into the server script. A series of operations such as data import, data analysis, and graph drawing are packaged in a shiny package to form a web application, so that the web application can be opened in a browser and the final results are presented on the network.

According to the generalized overview, the data table is imported through Shiny (Shiny is an application framework that provides a web interactive interface for an R model) and whether data in the data table is complete is determined; then, the data are analyzed to draw graphs and the obtained aerosol ion Maucha graph of each city in each time period is saved in a first folder (set as Folder figures) through a png data package; the aerosol ion Maucha graph of each city in the same time period is superimposed on a corresponding position of the geographical map (the geographical map is a satellite map, provided by another folder, set as Folder maps) through a ggimage data package, thus obtaining the temporal graph of aerosol ion concentration of each city in a single time period on the geographical map; and the temporal graph is saved in a second folder (set as Folder figures2) Then, when the user visits a web segment, the temporal graph of the aerosol ion concentration in the corresponding time period can be called through a magick data package and made into a gif dynamic picture, and data analysis and trend determination are carried out on the basis of the picture. It should be noted that the calling of the above-mentioned data packets can be implemented through a getGIF.r script file, and finally a route of the gif picture is returned to the shinyAPP server script, and the shinyAPP server script calls the picture according to the route.

Embodiment 2

In order to better analyze the inventive idea of the present disclosure, this embodiment divides the functions described in the invention in a form of system structure. As shown in FIG. 2 is a dynamic demonstration system for water-soluble ion concentration and composition of an aerosol, including an import module, a calculation module, and a drawing module, wherein the import module is configured to import equivalent concentration data of each ion in an atmospheric aerosol of a target city in a preset time period in a data table and transmit the equivalent concentration data to the calculation module;

the calculation module is configured to obtain vertex coordinates of each ion in a Maucha graph according to a first calculation formula and a second calculation formula on the basis of the equivalent concentration data of each ion;

the drawing module is configured to draw an aerosol ion Maucha graph of the target city in each preset time period according to the vertex coordinates of each ion in the Maucha graph;

wherein the first calculation formula is:

$$R^2\times\sin 22.5°/2=T/16,\ b\times R\times\sin 22.5°/2=P/2;$$

the second calculation formula is:

$$bx=b\times\cos(22.5°+45°\times n),\ by=b\times\sin(22.5°+45°\times n);$$

in the formulas, R refers to the radius of the circle in the Maucha graph; T refers to the total equivalent concentration of eight major ions in the atmospheric aerosol; b refers to a diagonal length corresponding to a quadrilateral of the corresponding ion in the Maucha graph; P refers to the equivalent concentration of the corresponding ion; bx refers to an abscissa of a vertex of the corresponding ion; by refers to an ordinate of the vertex of the corresponding ion; n refers to a constant variable that changes with an angle of a line of hexadec-section in the quadrilateral corresponding to the ion in the circle, and the value of n begins to vary counterclockwise with the starting angle (22.5°) of the line of hexadec-section and increases from 0 to 7.

The data table also includes time information and latitude and longitude information of the target city corresponding to the concentration data of each ion, and the corresponding data is input by an input module (usually input tools such as a keyboard).

The import module is further configured to convert ion categories in a water body in an original Maucha graph to ion categories in the atmospheric aerosol;

the ion categories in the atmospheric aerosol include eight major ions which are $K^+$, $Na^+$, $Ca^{2+}$, $NH_4^+$, $SO_4^{2-}$, $Cl^-$, $NO_3^-$, and $F^-$, respectively.

The drawing module further includes a superimposing unit, configured to superimpose the aerosol ion Maucha graph of each target city in the same time period on a geographical map according to the latitude and longitude information, draw a temporal graph of aerosol ion concentration, and make a dynamic picture according to the temporal graph of aerosol ion concentration in each time period.

The import module further includes a determining unit, configured to determine the data, wherein if there are more than a preset number of missing data in a row of the data table, the row of data is deleted.

R-Shiny is used for writing and packaging in the import module, the calculation module, the drawing module, the superimposing unit, and packaging results are displayed on a web terminal (through a display module, i.e., a display).

In summary, the dynamic demonstration method and system for water-soluble ion concentration and composition of an aerosol in the present disclosure displays the water-soluble ions in the atmospheric aerosol through the Maucha graph, so that the concentration of each ion can be displayed more intuitively. By integrating the aerosol ion Maucha graphs of various cities in the same time period on the same geographical map, the temporal graph of aerosol ion concentration is made, and the temporal graphs in various time periods are integrated into a dynamic picture, which can more intuitively display the concentration change trend and composition of water-soluble ions in the atmospheric aerosol of different cities in different time periods in the same time dimension.

R language (Shiny data package) is used to package and write programs, and the corresponding tasks (such as data import, data analysis, drawing, etc.) can be completed according to simple data without relying on front-end and back-end engineers. Because the R language is used and the operation can be easily displayed on the web terminal, it is easier to be accessed by other users, thus facilitating the transmission of information.

The specific embodiments described herein are only examples to illustrate the spirit of the present disclosure. Those skilled in the art to which the present disclosure belongs can make various modifications or additions to the specific embodiments described or use similar alternatives, without departing from the spirit of the present disclosure or going beyond the scope defined in the appended claims.

What is claimed is:

1. A dynamic demonstration method for ion concentration and composition of an aerosol, comprising the following steps:

S0: labeling quadrants of a Maucha graph with eight major ions in an atmospheric aerosol, wherein the eight major ions in the atmospheric aerosol are $K^+$, $Na^+$, $Ca^{2+}$, $NH_4^{+,}$ $SO_4^{2-}$, $Cl^-$, $NO_3^-$, and $F^-$, respectively;

S1: obtaining concentration data of each ion in the atmospheric aerosol of one of a plurality of target cities in each preset time period, converting the concentration data of each ion into equivalent concentration data of each ion, and filling the equivalent concentration data of each ion in a data table;

S2: obtaining a radius of a circle in a Maucha graph according to a first calculation formula, and obtaining a diagonal length corresponding to a quadrilateral of each ion in the Maucha graph according to the first calculation formula on the basis of the equivalent concentration data of each ion in the data table and the radius of the circle in the Maucha graph;

S3: obtaining vertex coordinates of each ion in the Maucha graph according to a second calculation formula on the basis of the diagonal length;

S4: drawing an aerosol ion Maucha graph of the one of a plurality of target cities in each preset time period according to the radius of a circle in a Maucha graph and the vertex coordinates of each ion in the Maucha graph; and S5: determining whether the aerosol ion Maucha graphs of all of a plurality of target cities are completed or not, and if not, switching the target city and returning to step S1;

wherein the first calculation formula is:

$$R^2 \times \sin 22.5°/2 = T/16 \quad b \times R \times \sin 22.5°/2 = P/2;$$

the second calculation formula is:

$$bx = b \times \cos(22.5° + 45° \times n), \quad by = b \times \sin(22.5° + 45° \times n);$$

in the formulas, R refers to the radius of the circle in the Maucha graph; T refers to total equivalent concentration of the eight major ions in the atmospheric aerosol; b refers to a diagonal length corresponding to a quadrilateral of a corresponding ion in the Maucha graph; P refers to the equivalent concentration of the corresponding ion; bx refers to the abscissa of a vertex of the corresponding ion; by refers to an ordinate of the vertex of the corresponding ion; n refers to an integer from 0 to 7;

S6: superimposing the aerosol ion Maucha graphs of each of the plurality of target cities in the same preset time period on a geographical map according to the latitude and longitude information, to form a temporal graph of aerosol ion concentration; and S7: repeating step S6 for each of the preset time periods;

S8: superimposing the temporal graphs of each aerosol ion concentration in each preset time period to form a dynamic picture.

2. The dynamic demonstration method for ion concentration and composition of an aerosol according to claim 1, wherein the data table also comprises time information and latitude and longitude information of the target city corresponding to the concentration data of each ion.

* * * * *